United States Patent
Sun et al.

(10) Patent No.: US 10,205,368 B2
(45) Date of Patent: Feb. 12, 2019

(54) AUXILIARY FIXING DEVICE FOR MOUNTING LONG SCREW OF DIRECT CURRENT MOTOR

(71) Applicant: ZHEJIANG LINIX MOTOR CO., LTD., Dongyang, Zhejiang (CN)

(72) Inventors: Zhubing Sun, Zhejiang (CN); Yaohui Ma, Zhejiang (CN)

(73) Assignee: ZHEJIANG LINIX MOTOR CO., LTD., Dongyang, Zhejiang (CN)

(*) Notice: Subject to any disclaimer, the term of this patent is extended or adjusted under 35 U.S.C. 154(b) by 292 days.

(21) Appl. No.: 15/168,048

(22) Filed: May 29, 2016

(65) Prior Publication Data

US 2017/0063207 A1    Mar. 2, 2017

(30) Foreign Application Priority Data

Aug. 27, 2015 (CN) .......................... 2015 1 0532840

(51) Int. Cl.
  *H02K 15/14* (2006.01)
  *H02K 15/02* (2006.01)
(52) U.S. Cl.
  CPC ............. *H02K 15/14* (2013.01); *H02K 15/02* (2013.01)
(58) Field of Classification Search
  CPC .............................. H02K 15/14; H02K 15/02
  USPC .......................................................... 310/91
  See application file for complete search history.

(56) References Cited

FOREIGN PATENT DOCUMENTS

| CN | 204216759 U | * | 3/2015 | |
|---|---|---|---|---|
| JP | 2009254115 A | * | 10/2009 | |
| JP | 2010007721 A | * | 1/2010 | |
| JP | 2010017068 A | * | 1/2010 | ........... H02K 15/024 |
| JP | 2013055791 A | * | 3/2013 | |
| KR | 20140120021 A | * | 10/2014 | |

* cited by examiner

*Primary Examiner* — Alex W Mok
(74) *Attorney, Agent, or Firm* — Global IP Services; Tianhua Gu

(57) ABSTRACT

An auxiliary fixing device for mounting a long screw of a direct current motor comprises a base and a vertically arranged support frame, the base is provided with a motor front end cover positioning plate, and a lower end of the support frame is fixed with a rear side of the base; the support frame is fixed with a lifting driving mechanism, and the lifting driving mechanism is fixed with a motor rear end cover compressing plate; the motor rear end cover compressing plate is provided with a number of long screw abdicating grooves corresponding to long screw through holes on the motor rear end cover; the base is provided with a front output shaft groove through which a motor front output shaft can pass, and the motor front end cover positioning plate is provided with a bearing chamber positioning groove which is matched with a motor front bearing chamber; and the motor rear compressing plate is provided with an outgoing line guide groove which is configured to accommodate a motor rear end cover outgoing line.

9 Claims, 3 Drawing Sheets

AUXILIARY FIXING DEVICE FOR MOUNTING LONG SCREW OF DIRECT CURRENT MOTOR

TECHNICAL FIELD OF THE INVENTION

The present invention relates to the field of an auxiliary device for assembling a motor, and in particular to an auxiliary fixing device for mounting a long screw of a direct current motor, by which a direct current motor is fixed when a long screw is mounted on the direct current motor.

BACKGROUND OF THE INVENTION

During the assembling of a direct current motor, an operator aligns long screw through holes of a front end cover, a housing and a rear end cover by marking or by providing a structure having small recesses or bumps on the housing, and then, compressing and thus fixing the front end cover, the housing and the rear end cover by hands to introduce a long screw. Because a corrugated gasket is provided between the housing and the front end cover and between the housing and the rear end cover, it is unable to firmly fix the front end cover, the housing and the rear end cover manually. As a result, several attempts of screwing a long screw is required to complete the assembly of the front end cover, the housing and the rear end cover of a direct current motor. This increases the labor intensity of the operators and decreases the operating efficiency.

SUMMARY OF THE INVENTION

An objective of the present invention is to provide an auxiliary fixing device for mounting a long screw of a direct current motor, which can fix a direct current motor to assist in compressing a long screw, and can reduce the labor intensity in the plant and increase the operating efficiency of assembling a direct current motor.

To achieve this objective, the present invention adopts the following technical solution. An auxiliary fixing device for mounting a long screw of a direct current motor is provided, including: a base and a vertically arranged support frame, the base is provided with a motor front end cover positioning plate, and a lower end of the support frame is fixed with a rear side of the base; the support frame is fixed with a lifting driving mechanism, and the lifting driving mechanism is fixed with a motor rear end cover compressing plate; the motor rear end cover compressing plate is relatively located above the motor front end cover positioning plate, and the motor rear end cover compressing plate is provided with a number of long screw abdicating grooves corresponding to long screw through holes on the motor rear end cover; the base is provided with a front output shaft groove through which a motor front output shaft can pass, and the motor front end cover positioning plate is provided with a bearing chamber positioning groove which is matched with a motor front bearing chamber; and the motor rear compressing plate is provided with an outgoing line guide groove which is configured to accommodate a motor rear end cover outgoing line.

When a direct current motor is to be fixed, the front end cover of the motor is placed to face downward and the rear end cover thereof is placed to face upward, so that a rotating shaft of the motor can be placed into the a lower rotating shaft groove. The motor rear end cover compressing plate is controlled by an actuating mechanism to displace downward to compress the motor rear end cover so as to fix the motor.

Then, the long screw is positioned with respect to the motor by the screw groove, so that the long screw can be screwed into the motor by an electric screwdriver. The operation is convenient and efficient. The outgoing line guide groove can prevent the outgoing line from being damaged when the motor rear end cover compressing plate compresses downward. The arrangement of the bearing chamber positioning groove can ensure higher fixing and positioning precision of the present invention and can be more convenient to fix the direct current motor, with no need for placing a positioning block around the bearing chamber to fix the motor front end cover. With the auxiliary fixing device of the present invention, a direct current motor can be better fixed, the problem of failing to mount a long screw due to the infirm fixation of the front end cover, the rear end cover and the housing can be avoided, and it is unnecessary to pull the long screw out and then compress the long screw again. Hence, the labor intensity can be reduced and the operating efficiency of the operators can be increased.

Preferably, an auxiliary motor positioning block is provided on a front side of the support frame, and a curved groove, which runs vertically and is matched with a side face of the motor, is provided on a front side of the auxiliary motor positioning block. The arrangement of the curved groove can fix the motor from the side face.

Preferably, the motor front end cover positioning plate is provided with a positioning pin which is matched with a motor front end cover process hole. Using the positioning pin structure in the motor front end cover and using the motor front end cover process hole as a positioning hole allows for high positioning precision, and the misalignment problem of the motor during the compressed assembling can be effectively avoided.

Preferably, the motor rear end cover compressing plate is provided with a rear output shaft groove through which the motor rear output shaft can pass, and the outgoing line guide groove is overlapped with the rear output shaft groove. The arrangement mentioned above is applicable to fix a double-output-shaft direct current motor.

Preferably, the lifting driving mechanism is a cylinder having double guide rods, and the double guide rods of the cylinder are fixed to the rear side of the motor rear end cover compressing plate. The motor rear end cover is compressed by the cylinder having double guide rods, allowing for higher positioning precision. Cushioning deformation and other problems during the compressing process of the cylinder can be solved effectively, by using a bending cylinder connecting plate structure.

Preferably, the long screw abdicating groove, the front output shaft groove and the outgoing line guide groove are all U-shaped.

Preferably, the auxiliary motor positioning block is made of plastic. Positioning and supporting the side face of the motor by plastic material can avoid damage to the motor.

Preferably, the lifting driving mechanism is fixed with a lifting mechanism connecting plate, the motor rear end cover compressing plate is located on a lower side of the lifting mechanism connecting plate with respect to the upper part of the motor front end cover positioning plate. A mechanism which is connected to the lifting driving mechanism and compresses the motor rear end cover consists of the lifting mechanism connecting plate and the motor rear end cover compressing plate. Hence, it is easy for machining.

Preferably, a tapered slope structure is formed at an upper end of the positioning pin. The front end cover process hole of the direct current motor is a threaded hole to be mounted.

At the front end of the threaded hole, there is a slope tilted inward, which is matched with the tapered slope structure of the positioning pin, so that the direct current motor can be better positioned by the auxiliary fixing device of the present invention.

The auxiliary fixing device of the present invention is configured to fix a direct current motor so as to assist in assembling the motor front end cover, the housing and the rear end cover, and has the advantages of high positioning precision, convenience and efficiency, reduced labor intensity in the plant, and increased assembly efficiency of direct current motors.

DETAILED DESCRIPTION OF THE INVENTION

Figure 1:
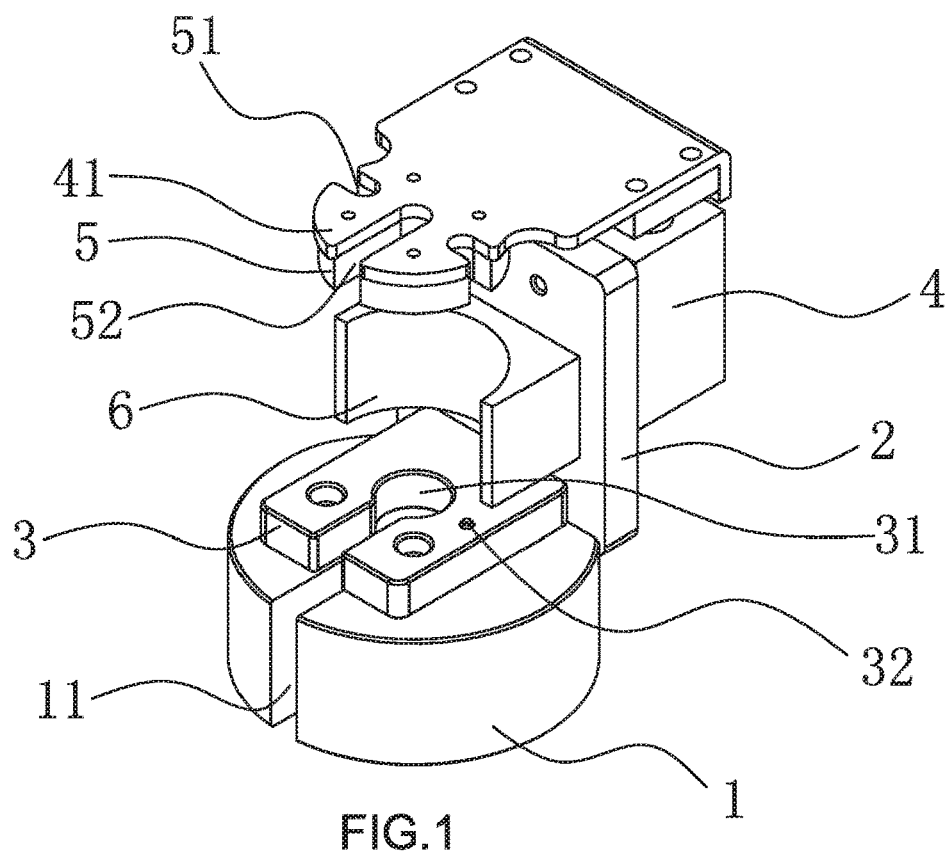
FIG. 1 is a schematic structure diagram of the present invention.

As shown in FIG. 1, a direct current motor fixing device of the present invention, which is configured to fix a direct current motor when a long screw is mounted on the direct current motor, includes a base 1 and a vertically arranged support frame 2; the base is provided with a motor front end cover positioning plate 3, and a lower end of the support frame 2 is fixed with a rear side of the base 1; the support frame 2 is fixed with a lifting driving mechanism, and the lifting driving mechanism is fixed with a motor rear end cover compressing plate 5; and an auxiliary motor positioning plate 6 is arranged at the front side of the support frame 2. The lifting driving mechanism is a cylinder having double guide rods 4, and the auxiliary motor positioning plate 6 is made of polyformaldehyde material.

Figure 2:
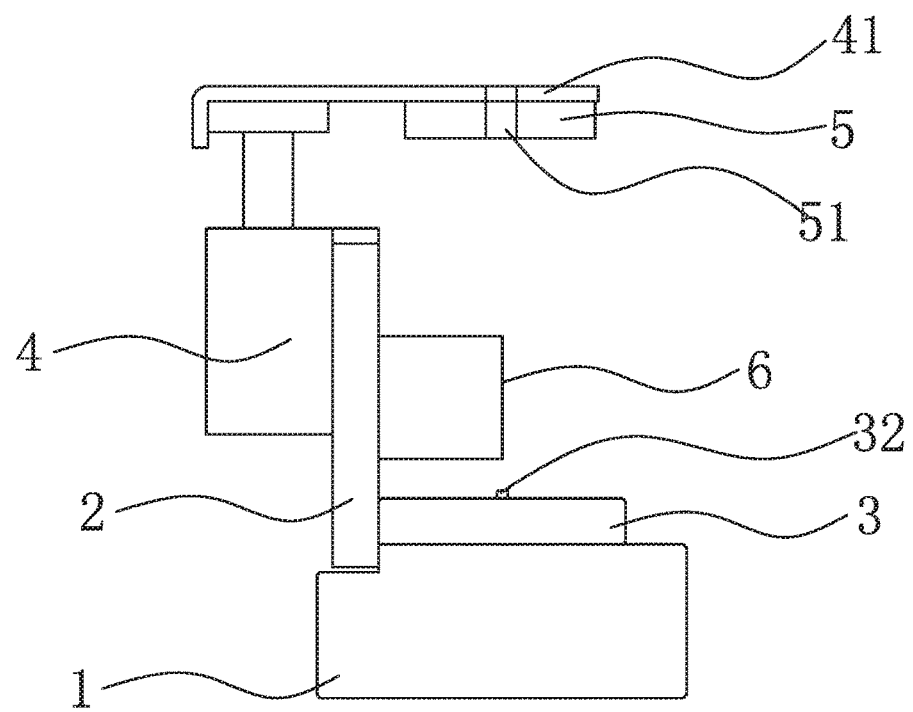
FIG. 2 is a side view of the present invention.

As shown in FIG. 1 and FIG. 2, the double guide rods of the cylinder having double guide rods 4 are fixedly connected to a lifting mechanism connecting plate 41. The motor rear end cover compressing plate 5 is located on a lower side of the lifting mechanism connecting plate 41 with respect to the upper part of the motor front end cover positioning plate 3. The shape of the front end of the lifting mechanism connecting plate 41 is consistent to the shape of the motor rear end cover compressing plate 5. The cylinder having double guide rods 4 can enable the motor rear end cover compressing plate 5 to displace up and down.

Figure 3:
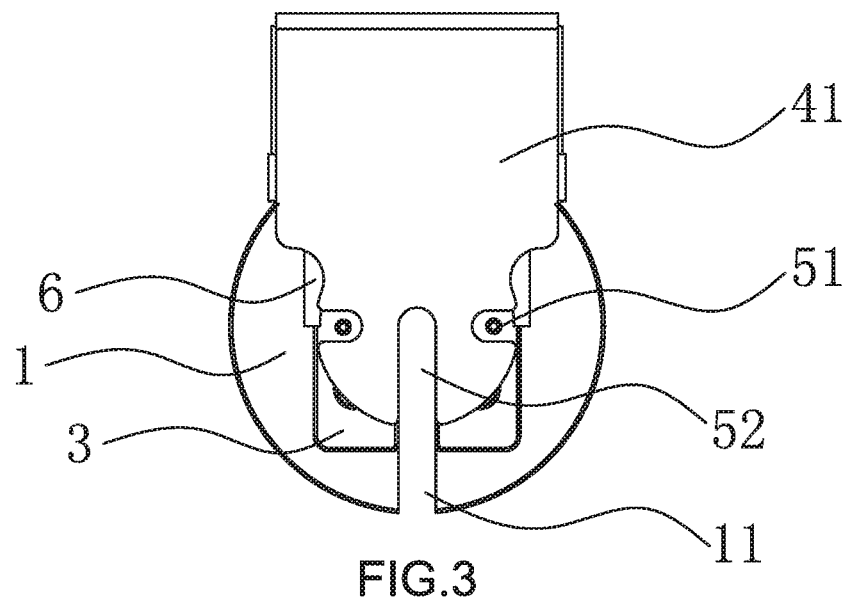
FIG. 3 is a top view of the present invention.
Figure 4:
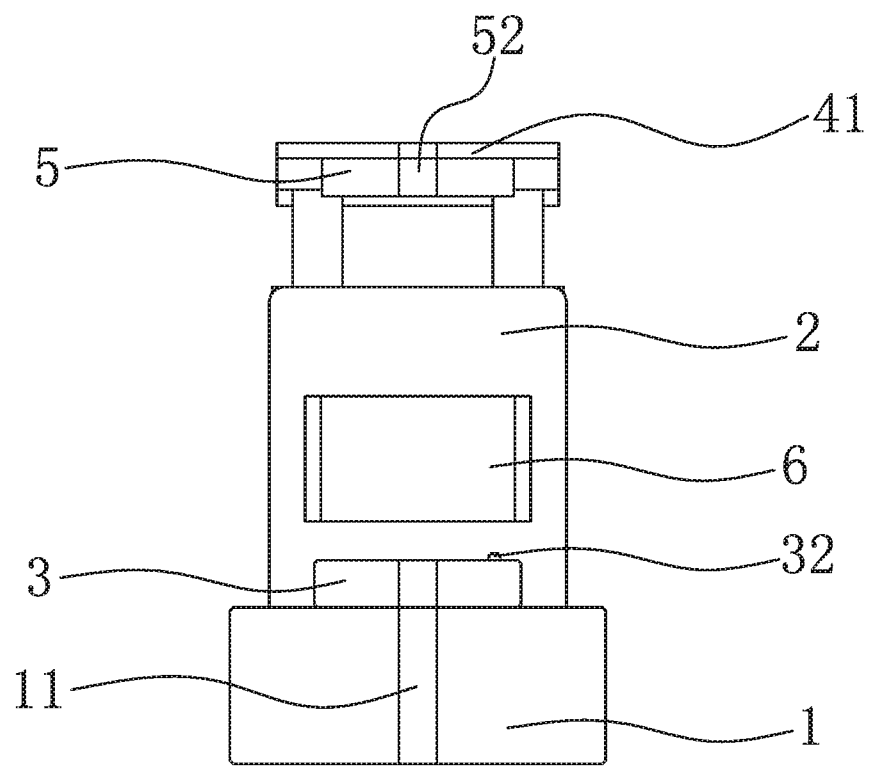
FIG. 4 is a front view of the present invention.

As shown in FIG. 1, FIG. 3 and FIG. 4, one U-shaped long screw abdicating groove 51 matched with a long screw through hole on the motor rear end cover is arranged on the opposite left and right sides of the motor rear end cover compressing plate 5, respectively. A U-shaped rear output shaft groove 52 which has a forward opening, through which the motor rear output shaft can pass, is formed in the center of the motor rear end cover compressing plate 5. The motor rear end cover compressing plate 5 is provided with an outgoing line guide groove which is configured to accommodate a motor rear end cover outgoing line, and the outgoing line guide groove is overlapped with the rear output shaft groove 52. The base 1 is provided with a U-shaped front output shaft groove 11 through which the motor front output shaft can pass. The motor front end cover positioning plate 3 is provided with a bearing chamber positioning groove 31 which is matched with a motor front bearing chamber. The motor front end cover positioning plate 3 is also provided with a positioning pin 32 which is matched with a motor front end cover process hole.

Figure 5:
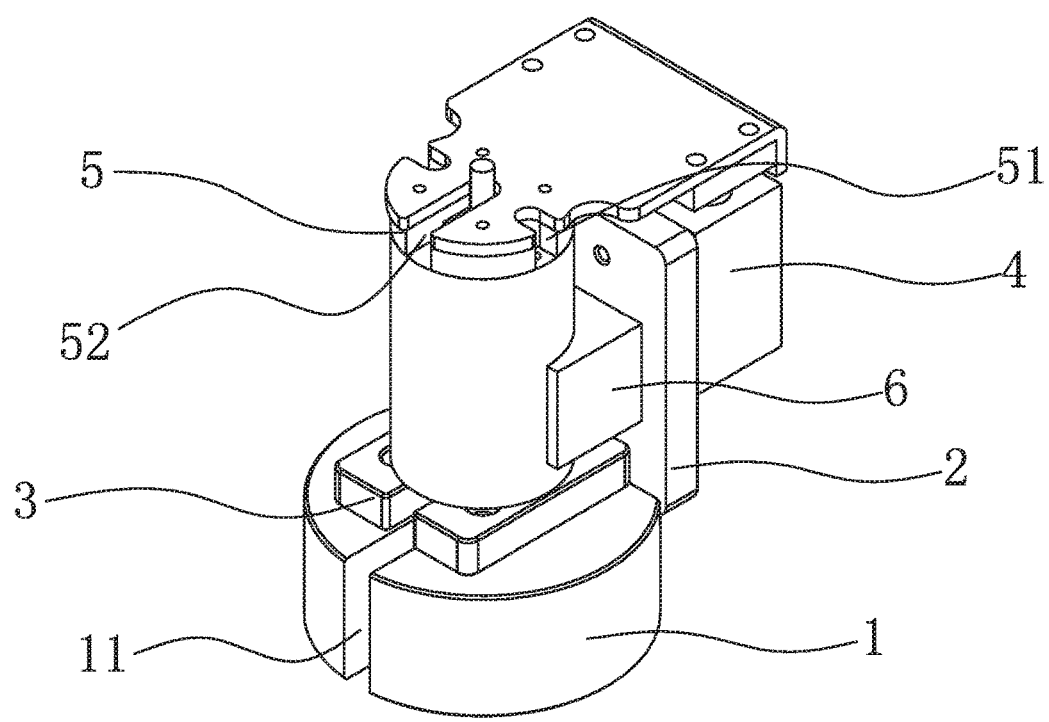
FIG. 5 is a schematic structure diagram for fixing a direct current motor according to the present invention.

As shown in FIG. 1 and FIG. 5, a curved groove, which runs vertically and is matched with a side face of the motor, is provided on a front side of the auxiliary motor positioning block 6.

As shown in FIG. 1 and FIG. 5, when a long screw is to be screwed into a direct current motor, after aligning the long screw through holes of the front end cover, the housing and the rear end cover, the direct current motor is placed on the motor front end cover positioning plate 3 with the front end cover thereof facing downward and the rear end cover thereof facing upward; the motor is leaned against the curved groove of the auxiliary motor positioning plate 6; the bearing chamber of the motor front end cover is located inside the bearing chamber positioning groove 31; the motor rotating shaft is located inside the front output shaft groove 52 and the rear output shaft groove 11; the positioning pin 32 is located inside the process hole on the motor front end cover. The cylinder having double guide rods 4 is controlled to compress the motor rear end cover by the motor rear end cover compressing plate 5 so as to fix the direct current motor. Then, the long screw is inserted into the long screw abdicating hole 51, and screwed into the motor by an electric screwdriver in order to complete the assembly of the direct current motor.

What is claimed is:

1. An auxiliary fixing device for mounting a long screw of a direct current motor, comprising a base and a vertically arranged support frame, characterized in that the base is provided with a motor front end cover positioning plate, and a lower end of the support frame is fixed with a rear side of the base; the support frame is fixed with a lifting driving mechanism, and the lifting driving mechanism is fixed with a motor rear end cover compressing plate; the motor rear end cover compressing plate is relatively located above the motor front end cover positioning plate, and the motor rear end cover compressing plate is provided with a number of long screw abdicating grooves corresponding to long screw through holes on the motor rear end cover; the base is provided with a front output shaft groove through which a motor front output shaft can pass, and the motor front end cover positioning plate is provided with a bearing chamber positioning groove which is matched with a motor front bearing chamber; and the motor rear end cover compressing plate is provided with an outgoing line guide groove which is configured to accommodate a motor rear end cover outgoing line.

2. The auxiliary fixing device for mounting a long screw of a direct current motor according to claim 1, characterized in that an auxiliary motor positioning block is provided on a front side of the support frame, and a curved groove, which runs vertically and is matched with a side face of the motor, is provided on a front side of the auxiliary motor positioning block.

3. The auxiliary fixing device for mounting a long screw of a direct current motor according to claim 1, characterized in that the motor front end cover positioning plate is provided with a positioning pin which is matched with a motor front end cover process hole.

4. The auxiliary fixing device for mounting a long screw of a direct current motor according to claim 3, characterized in that a tapered slope structure is formed at an upper end of the positioning pin.

5. The auxiliary fixing device for mounting a long screw of a direct current motor according to claim 1, characterized in that the motor rear end cover compressing plate is provided with a rear output shaft groove through which the motor rear output shaft can pass, and the outgoing line guide groove is overlapped with the rear output shaft groove.

6. The auxiliary fixing device for mounting a long screw of a direct current motor according to claim 1, characterized in that the lifting driving mechanism is a cylinder having double guide rods, and the double guide rods of the cylinder are fixed to the rear side of the motor rear end cover compressing plate.

7. The auxiliary fixing device for mounting a long screw of a direct current motor according to claim 1, characterized in that the long screw abdicating groove, the front output shaft groove and the outgoing line guide groove are all U-shaped.

8. The auxiliary fixing device for mounting a long screw of a direct current motor according to claim 1, characterized in that the auxiliary motor positioning block is made of plastic.

9. The auxiliary fixing device for mounting a long screw of a direct current motor according to claim 1, characterized in that an outlet end of the lifting driving mechanism is fixed with a lifting mechanism connecting plate, the motor rear end cover compressing plate is located on a lower side of the lifting mechanism connecting plate with respect to the upper part of the motor front end cover positioning plate.

\* \* \* \* \*